Sept. 21, 1954     K. L. MAGEE     2,689,443
REEL ADJUSTING MEANS FOR COMBINATION
HARVESTER AND THRESHING MACHINES
Filed March 5, 1951     2 Sheets-Sheet 1
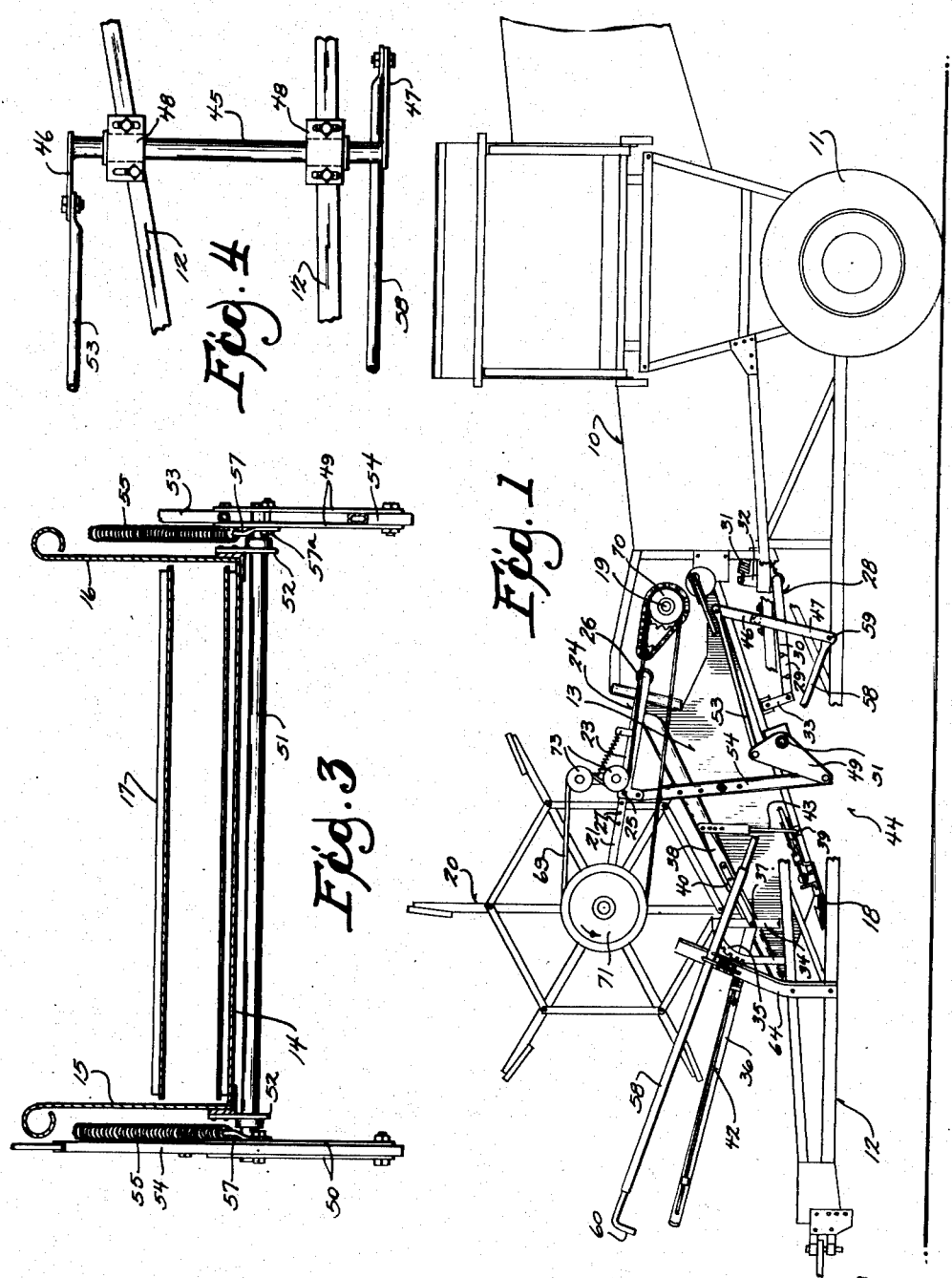
Inventor
KENNETH L. MAGEE
By
Attorney

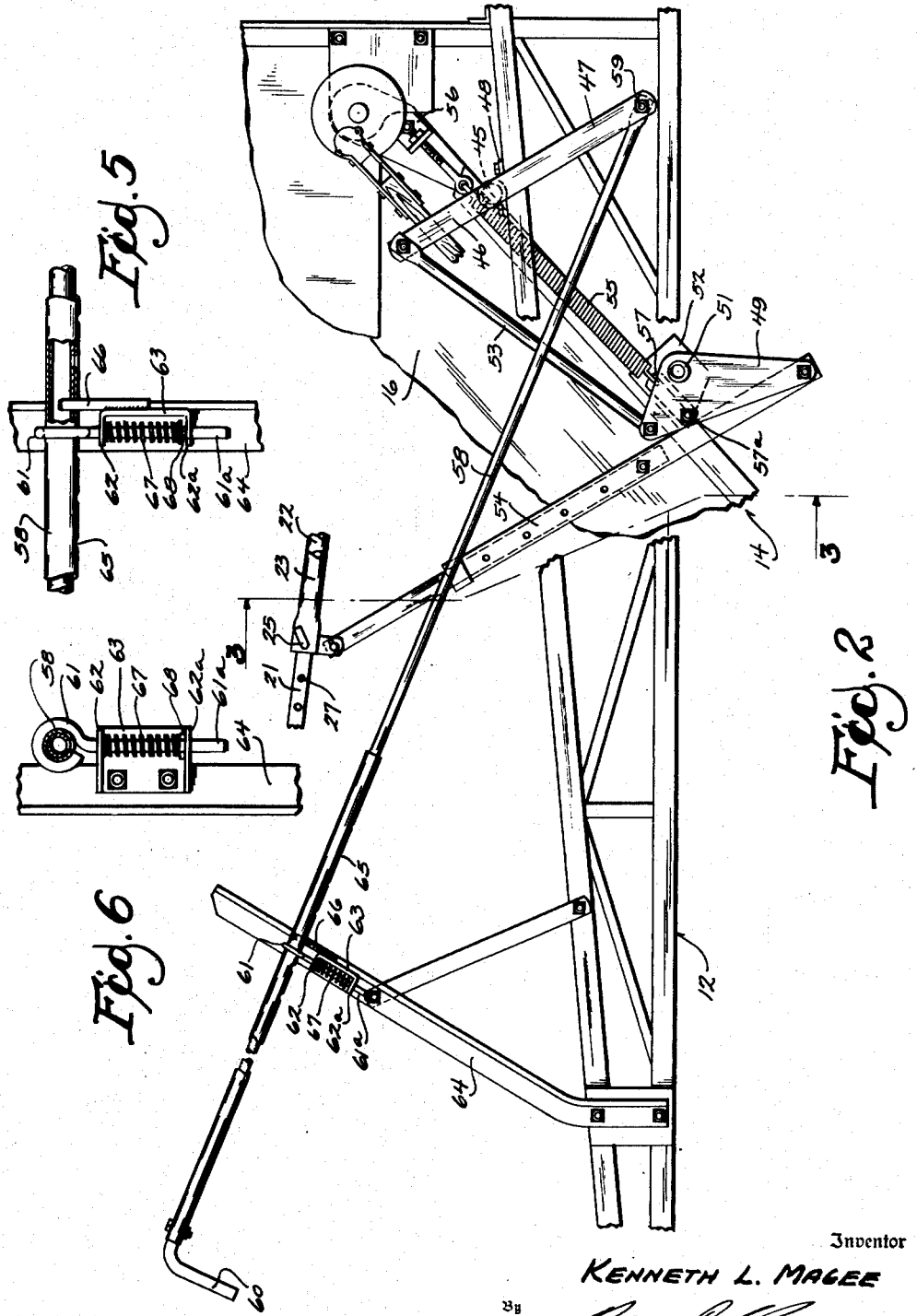

Patented Sept. 21, 1954

2,689,443

UNITED STATES PATENT OFFICE 2,689,443

REEL ADJUSTING MEANS FOR COMBINATION HARVESTER AND THRESHING MACHINES

Kenneth L. Magee, Burlington, Iowa, assignor to J. I. Case Company, Racine, Wis., a corporation of Wisconsin Application March 5, 1951, Serial No. 213,863

8 Claims. (Cl. 56—224)

1

The present invention relates generally to improvements in adjusting mechanisms for a combination harvester and threshing machine and more particularly to means within easy reach of the operator of a tractor for raising or lowering the reel of the harvester during advance of the machine.

The primary object of the present invention is to improve the operation and construction of mechanism of this class.

A further object is to provide means for adjusting the cutter bar and the harvester reel independently in such a manner that the reel may be maintained at its best operating position with respect to the cutter bar, and for adjusting both the cutter bar and the reel simultaneously without substantially disturbing their relative positions with respect to each other.

Other objects and advantages will be apparent from the attached specification and accompanying drawings in which:

Fig. 1 is left side elevation of a combine harvester embodying the present invention, certain portions of the machine being broken away to more clearly show details of construction;

Fig. 2 is a view similar to Fig. 1, with parts removed, to more clearly illustrate the reel adjusting means of the present invention slightly enlarged;

Fig. 3 is a view taken on the line 3—3 of Fig. 2, with parts removed and broken away to more clearly show the details in construction;

Fig. 4 is an enlarged plan view of certain mechanism indicated in Fig. 2;

Fig. 5 is an enlargement of the lever and locking mechanism shown in Fig. 2 with parts removed and with parts in section;

Fig. 6 is a front view with parts in section of the structure shown in Fig. 5.

Referring to Fig. 1 of the drawings the combine embodying the present invention comprises in the present instance a main body or housing 10 movably supported by transversely spaced wheels 11 only one of which is shown and includes on one side a frame or drawbar 12 of any conventional or suitable construction which has the usual connection adjacent the forward end thereof for connection to a tractor or other suitable propelling means. The main body or housing 10 contains the usual threshing and cleaning mechanisms which can be of any conventional or suitable construction, not shown.

A swingable header or cutting mechanism is designated generally by the number 13 and comprises the usual supporting member 14 having

2 spaced side walls 15 and 16, an intervening raddle or conveying apron 17, and a forwardly and transversely disposed cutter bar or sickle 18, see also Fig. 3. This assembly is vertically adjustable at its forward end about the axis of a shaft 19, which also drives the conveyor 17, to thereby vary the height at which the grain is cut by the sickle 18, the cut of grain falling into the conveyor to be carried rearwardly into the threshing and cleaning mechanism in a manner well known in the art.

A reel 20 of any conventional or suitable construction is supported for rotation about a substantially transverse axis above the sickle 18 by arms 21 which extend rearwardly and are secured in forwardly extending tubular arms 22 and 23 of a conventional bail 24 by means of pins or other suitable means 25. The bail is journaled in a sleeve 26 which is carried above the supporting member 14 for permitting swinging of the reel in a vertical arc above the sickle 18. The arms 21 are provided with spaced openings 27 for permitting fore-and-aft adjustment of the reel with respect to the sickle 18 as is usual in header constructions.

For gathering crops at different heights, header mechanism 13 is adjustable, being pivoted to the body 10 about the axis of the shaft 19 as previously suggested. Swinging of the header 13 up and down accordingly does not disturb the relationship between the driving and driven rollers of the conveyor 17 as well known in the art. The header is counterbalanced by a bifurcated brace member 28, extending underneath the header and pivoted at the front of the body portion 10. Member 28 includes arms 29 and 30 which are urged upwardly by counterbalancing springs 31 anchored rearwardly to some convenient portion of the body 10, and pulling rearwardly against arm 32, fixed with above mentioned member 28. The arms 29 and 30 are connected with the underside of the header 13 as by links or other suitable means 33. The tension of the springs 31 may be regulated by any conventional or suitable means, not shown, so that the header 13 may be substantially balanced by the upward thrust of the arms 29 and 30. Header 13 will accordingly float over the ground with a minimum amount of pressure thereon.

Drawbar 12 supports regulating means for the adjustment of the height of header 13. A standard 34, suitably secured with drawbar 12, is provided for carrying a quadrant 35 fixed therewith and with drawbar 12. A lever 36 is pivoted on the standard 34 as by a pin 37 or the like, and has a rearward extension 38 extending over a laterally extending portion 39 of the header 13. To lock the header in adjusted position and to make the regulating means rigid enough for this purpose, extension 38 has a brace portion 40 secured forwardly by pin 37 to the opposite side of standard 34, and lever 36 has a clevis and latch of suitable or well known construction generally designated as 42 for well known purposes. Extension 38 of lever 36 is connected with laterally extending portion 39 of header 13 by means of a link or other suitable means 43 whereupon swinging movement of the lever 36 about the pin 37 will initiate movement of the header 13 either upwardly or downwardly about the axis of shaft 19 as well known in the art.

For the purpose of adjusting the reel independently of the header 13 in such a manner that the reel may be maintained at its best operating position with respect to the sickle during advance of the machine, a reel adjusting mechanism generally designated 44 is provided. Specifically reel adjusting means 44 comprises in the present instance a rock shaft 45 having a pair of arms 46 and 47, see Fig. 4. Rock shaft 45 is rotatably journaled in bearings 48 which in turn are suitably fixed to the drawbar 12 so as to position rock shaft 45 substantially transverse to the direction of travel of the machine. Bell cranks 49 and 50, preferably in the form of spaced apart triangular-shaped metal plates, are fixed adjacent the ends of a shaft 51 in substantially aligned relationship and shaft 51 is rotatably carried in suitable brackets 52 depending from opposite sides of header 13 so as to position shaft 51 substantially transverse with respect to the direction of travel of the machine, the bell cranks 49 and 50 being positioned adjacent the opposite sides of the header 13, see Fig. 3. One end of bell crank 49 is connected to the arm 46 of the rock shaft 45 by means of a link or other suitable means 53 and the other end of bell crank 49 and the corresponding end of the bell crank 50 are connected respectively to the arms 22 and 23 of bail 24 by means of suitable reel supporting links 54, of any well known construction. Counterbalance springs 55, Fig. 2, are anchored between suitable brackets 56 secured rearwardly to the header 13 and arms 57 pivotally secured by means of bolts or other suitable means 57ª to bell cranks 49 and 50 respectively. It will be appreciated that as the reel 20 is lowered, as will be explained hereinafter, the springs 55 will be placed under tension, in the present instance, and will serve as a counterbalance to assist in elevating the reel.

For rocking rock shaft 45 a sliding control rod 58 is provided. Rod 58 is pivotally secured adjacent one end thereof by means of a bolt or other suitable means 59 substantially adjacent the end of the arm 47 and is provided adjacent the other end thereof with a suitable hand grip 60 located within easy reach of an operator of a tractor or other propelling means, it being understood that the machine in the present instance is coupled to the tractor by connecting the clevis of drawbar 12 to the drawbar of the tractor in a manner well known in the art. The lever 58 is slidable in an eyelet 61 which has a shank portion 61ª which in turn is slidably carried in forwardly extending flanges 62 and 62ª of a channel bracket 63. The channel bracket 63 is fixed as by welding or the like to a rearwardly inclining standard 64 which is rigidly secured to drawbar 12 so as to support rod 58 in an upwardly and forwardly inclined position. It will be appreciated that sliding movement of the rod 58 in the eyelet 61 will rock rock shaft 45 forwardly or rearwardly for initiating movement of the reel 20, either upwardly or downwardly as will be more clearly explained hereinafter.

The rod 58 has formed therein a plurality of spaced openings 65 and the bracket 63 has fixed thereto a substantially upwardly extending lock pin or the like 66 for engagement in one or the other of openings 65 for locking the rod at selected positions with respect to the eyelet 61. As will be apparent varying positions of rod 58 with respect to eyelet 61 will result in various positions of rock shaft 45 when pin 66 is engaged in one of the openings 65, and this through link 53, bell cranks 49 and 50, and supporting links 54, will result in various positions of the reel 20 with respect to the sickle 18. A spring 67 encircles the shank portion 61ª and is compressed between the flange 62 and a stop 68 fixed to shank portion 61ª for urging the eyelet against the flange 62 of bracket 63 and consequently locking rod 58 against sliding movement when the pin 66 is engaged in one or the other of openings 65.

Reel 20 is driven in the direction indicated by means of a suitable belt or the like 69 which is trained around a driving pulley 70 secured adjacent one end of shaft 19 and a driven pulley 71 which is secured adjacent the corresponding end of the reel 20 as well known in the art. Suitable idler pulleys 73 are resiliently trained against belt 69 for keeping belt 69 taut at all times regardless of the adjustments of the reel 20 with respect to the header 13.

In the operation of the above described harvesting and threshing machine, it is often necessary to adjust the height of the sickle 18 with respect to the ground during forward travel of the machine. Toward this end the header 13 can be pivotally raised or lowered about the axis of the shaft 19 by actuating the clevis and latch mechanism 42 so as to unlatch the lever 36 from its locked relationship with respect to the quadrant 35 and then swinging the lever 36 either forwardly or rearwardly for lifting or lowering the header 13 as well known in the art. Upon reaching the proper elevation for the header 13, the lever 36 is again locked with respect to movement about pin 37 by means of the clevis and latch mechanism 42. It will be noted that any movement initiated to the header 13 by means of swinging movement of the lever 36 has no effect upon the rock shaft 45. It will be further noted that the rock shaft 45 is not co-axial with respect to the axis of the shaft 19 so that upon upwardly swinging movement of the header 13, link 53 is put in tension for rocking bell cranks 49 rearwardly, the amount of rocking motion imparted to bell crank 49 being in direct proportion to the amount of movement initiated to the lever 36 for swinging the header upwardly. It will therefore be apparent that upon upward swinging movement of the header 13, reel 20 will be swung in the same direction a distance equal to the distance moved by the header 13 plus a distance in the same direction determined by the amount of rocking movement imparted to bell crank 49 by the tension exerted on link 53, which in the usual range of adjustment is relatively slight and of no consequence. Upon downward swinging movement of header 13, link 53 is in compression and the reel is lowered instead of raised, a distance equal to the distance moved by header 13 plus a distance in proportion to the amount of downward swinging movement initiated to the bell crank 49 caused by the compression of link 53. This downward swinging movement of the reel caused by compression of link 53 is also so slight as to be of no consequence and for substantially all operations the header and the reel are simultaneously adjusted without substantially changing their relative positions with respect to each other.

For swinging the reel 20 downwardly with respect to the sickle 18 of the header, the operator from his position on the tractor and while the tractor is in motion, grasps the hand grip 60 of rod 58 and exerts sufficient force upwardly upon the eyelet 61 to overcome the force exerted by the spring 67 so that pin 66 is disengaged from one or the other of openings 65. Upon unlocking of rod 58, the operator pushes upon the rod so as to push the rod against the arm 47 of the rock shaft 45, so as to swing the arm 46 forwardly. Forward movement of arm 46 rocks bell crank 49 forwardly or counterclockwise by means of link 53, bell crank 50 being moved substantially the same distance in the same direction by means of shaft 51. The supporting links 54 are consequently pulled downwardly a distance in proportion to the counterclockwise movement of the bell cranks 49 and 50 and the reel 20 is biased downwardly, limited only by the resistance exerted by the bell cranks upon supporting links 54. When the operator wishes to lock the movement of the reel 20 with respect to sickle 18, he stops exerting an upward force upon the rod 58 whereupon the force exerted by spring 67 will maintain the rod 58 in frictional contact with the pin 66 and then upon slight movement either forwardly or rearwardly, pin 66 can be engaged in the opening 65 in closest proximity to the selected point of adjustment. To raise the reel 20 with respect to the sickle 18 the operator disengages the rod 58 from pin 66 in a manner as already described and pulls the rod forwardly through the eyelet 61 so as to pull or swing the arm 47 forwardly. Upon forward swinging movement of arm 47, arm 46 is swung rearwardly so as to rock bell crank 49, and consequently bell crank 50 and shaft 51, rearwardly or in a clockwise direction by means of link 53. Rearward swinging of bell cranks 49 and 50 lifts the reel 20 by means of supporting links 54, the amount of lift imparted to the reel 20 being in proportion to the clockwise movement of the bell cranks 49 and 50.

The above being a complete description of an illustrative embodiment of the invention, what is claimed as new and desired to be secured by Letters Patent of the United States is:

1. In a harvester having a forwardly extending drawbar, a swingable header pivoted for vertical adjustment about an axis, a reel disposed above said header and mounted for adjustment about a transverse axis, a rock shaft having a pair of arms and rotatably carried by said drawbar, a bell crank rotatably carried by said swingable header adjacent said drawbar, a link for connecting one arm of said rock shaft to said bell crank, supporting means between the other arm of said bell crank and the reel for swinging the reel upon rotative movement of the bell crank, a fore-and-aft control rod slidably secured with respect to said drawbar and secured to the other arm of said rock shaft upon sliding movement of said rod, and means for locking said rod against movement.

2. In an implement having a body, a drawbar extending forwardly therefrom for connection with a propelling means, a header on said body for pivotal movement about a transverse axis, said header including a sickle secured forwardly thereto, and a reel rotatably carried for swinging movement in a substantially vertical arc on said body, the improvement comprising a reel adjusting means for adjusting the height of said reel with respect to said body, comprising a rock shaft rotatably carried by said drawbar substantially transverse to the direction of travel of said machine, said rock shaft having one arm secured adjacent each end thereof, a shaft rotatably carried adjacent the underside of said header and substantially transverse to the direction of movement of said machine, bell cranks fixed adjacent the opposite ends of said shaft laterally of said header, a link for connecting one arm of one of said bell cranks to one arm of said rock shaft, supporting links connecting the other arm of said bell crank and the corresponding arm of said other bell crank to said reel for swinging said reel upon rotatable movement of said bell cranks, a standard secured to said drawbar, an eyelet on said standard, a control rod slidable in said eyelet and secured to the other arm of said rock shaft whereupon sliding movement of said rod in said eyelet will initiate a rocking motion in said rock shaft for rotating said bell crank in one direction, and means for preventing sliding movement of said rod with respect to said eyelet for locking said rock shaft against movement for positioning said reel in various adjusted positions with respect to said sickle.

3. A locking means for use with an implement having a drawbar, a rock shaft carried by said drawbar and rockable about a transverse axis, and a control rod connected to said rock shaft for rocking said rock shaft upon fore-and-aft movement of said rod, said rod having formed thereon spaced openings, a substantially upwardly extending standard secured to said drawbar, an eyelet surrounding said rod and having a shank portion slidably supported with respect to said standard, a pin fixed with respect to said standard and selectively engageable in one of said openings for locking said rod against sliding movement relative to said eyelet, and resilient means for selectively urging one of said openings into engagement with said pin.

4. A locking means for use with an implement having a drawbar, a rock shaft carried by said drawbar and rockable about a transverse axis, a control rod pivotally connected to one arm of said rock shaft for rocking said rock shaft upon fore-and-aft movement of said rod, said rod having formed on the under surface thereof spaced openings, an upwardly extending standard secured to said drawbar, a flanged bracket fixed to said standard, an eyelet having a shank portion upwardly and slidably supported in said flanged bracket for slidably supporting said rod, a pin fixed to said flanged bracket in longitudinal alignment with said eyelet and engageable in one of said openings for locking said rod against sliding movement with respect to said eyelet, and means for continuously urging said eyelet downwardly in said flanged bracket for urging said rod into engaging relationship with said pin.

5. A locking means for use with an implement having a drawbar, a rock shaft carried by said drawbar and rockable about a transverse axis, and a control rod pivotally connected to one arm on said rock shaft for rocking said rock shaft upon substantially fore-and-aft movement of said rod, said rod having formed therein spaced openings, an upwardly extending standard secured to said drawbar, a flanged bracket fixed to said standard, an eyelet having a shank portion slidably supported in said bracket for slidably supporting said rod, said shank portion having formed thereon a stop, a pin fixed to said flanged bracket and engageable in one of the openings of said rod for locking said rod against sliding movement, and a spring encircling said shank portion between said stop and one of the flanges of said flanged bracket for continuously urging said rod against said pin.

6. In an implement having a drawbar and a fore-and-aft adjusting member, said adjusting member provided with downwardly directed openings, an upwardly extending standard secured to said drawbar, a bracket on said standard, an eyelet member freely surrounding said adjusting member and provided with a shank slidable in said bracket, an upwardly directed pin selectively engageable in said openings and secured to said standard, and resilient means surrounding said shank to urge said eyelet member downwardly to engage one of said openings with said pin.

7. In an implement having a frame and an adjusting member for fore-and-aft adjustment, said adjusting member provided with a plurality of downwardly directed openings, an upwardly-directed standard secured to said frame, an eyelet member freely surrounding said adjusting member and provided with a shank slidable on said standard, a locking member secured to said standard for selective engagement with said opening member upon engagement with one of said openings with said locating member, and resilient means co-operating with said shank to urge said adjusting member into engagement with said locking member.

8. In an implement having a frame and an adjusting member for fore-and-aft adjustment, said adjusting member provided with a plurality of openings longitudinally spaced thereon, a standard secured to said frame, guide means for said adjusting member, a locking member secured to said standard, and resilient means to urge said adjustable member toward said locking member to engage one of said openings with said locating member.

References Cited in the file of this patent
UNITED STATES PATENTS

| Number | Name | Date |
|---|---|---|
| 576,196 | Peck | Sept. 8, 1896 |
| 732,994 | Appleby | July 7, 1903 |
| 1,621,773 | Fetcher | Mar. 22, 1927 |
| 1,794,720 | Maysent | Mar. 3, 1931 |
| 1,945,009 | Walsh et al | Jan. 30, 1934 |
| 2,199,629 | Heth et al. | May 7, 1940 |
| 2,226,563 | Keith | Dec. 31, 1940 |
| 2,345,847 | Wink | Apr. 4, 1944 |
| 2,510,425 | Sieverding | June 6, 1950 |